Patented July 31, 1951

2,562,853

UNITED STATES PATENT OFFICE 2,562,853

INSOLUBILIZATION OF WATER-SOLUBLE COPOLYMERS

Massimo Baer, Springfield, Mass., assignor to Monsanto Chemical Company, St. Louis, Mo., a corporation of Delaware No Drawing. Application August 14, 1948,
Serial No. 44,401

4 Claims. (Cl. 260—78.5)

This invention relates to new polymeric products.

It has been suggested that vinyl esters such as vinyl acetate be copolymerized with maleic anhydride. The resulting products tend to be water-soluble and remain so even after being subjected to elevated temperatures. While useful for certain purposes, the characteristic of water-solubility is detrimental for other purposes and a polymeric product of generally similar properties with the additional characteristic of being rendered water-insoluble would be highly useful.

It is an object of this invention to provide water-soluble polymers, which are readily rendered water-insoluble.

A particular object of the invention is to provide water-soluble heteropolymers of maleic anhydride which may be rendered water-insoluble.

These and other objects are accomplished according to this invention by providing a water-soluble copolymer of a substance from the group consisting of maleic anhydride and maleic, acrylic, methacrylic and crotonic acids with a copolymerizable material containing a $CH_2=C<$ group in which at least 25% on a molar basis, of the material copolymerized therewith is vinyl formate.

Thus, it has been discovered that water-soluble copolymers of this type have the unexpected characteristic of being convertible into water-insoluble products, e. g., by the action of heat in the presence of water.

The following examples are illustrative of the present invention, but are not to be construed as limitative thereof. Where parts are mentioned, they are parts by weight.

Example I

| | Parts |
|---|---|
| Maleic anhydride | 98 |
| Vinyl formate | 72 |
| Benzoyl peroxide | 0.4 |
| Benzene | 400 |

The above ingredients are placed in a suitable glass vessel and thereafter the air above the charge is swept out with an inert gas such as nitrogen. The vessel is closed and heated at 50° C. for 3 days. The product comprises a soft gel from which the benzene is removed by heating at 150° F. in the open. The product is a white heteropolymer of maleic anhydride and vinyl formate which is initially soluble in water. On heating an aqueous solution of this product for 15 minutes at 120° C., it is converted into an infusible product which swells, but does not dissolve in water.

The procedure followed in preparing the products of the examples in Table I is the same as that used in Example I. The several ingredients used in Examples II–VI are tabulated below in Table I.

Table I

| Example | Maleic Anhydride | Vinyl Acetate | Vinyl Formate | Benzoyl Peroxide | Benzene |
|---|---|---|---|---|---|
| | Gram mols | Gram mols | Gram mols | Grams | Cc. |
| II | 1.0 | | 1.0 | 0.2 | 60 |
| III | 1.0 | 0.2 | 0.8 | 0.2 | 60 |
| IV | 1.0 | 0.5 | 0.5 | 0.2 | 60 |
| V | 1.0 | 0.8 | 0.2 | 0.2 | 60 |
| VI | 1.0 | 1.0 | | 0.2 | 60 |

The products of Examples II–VI are freed from benzene by evaporation to yield, in each case, a white, powdery heteropolymer which is soluble in water.

It is discovered that if films cast from aqueous solutions of the products described in Examples II–VI are heated at 120° C. for 10–15 minutes, the heteropolymers are converted into a water-insoluble state. In contrast thereto, the heteropolymers of Examples V and VI when subjected to the same treatment, remain water-soluble.

The temperature and duration of the heating periods for conversion of the copolymers of the invention into the water-insoluble state are mutually interdependent. Thus, long standing at room temperature may be sufficient to effect the conversion. Usually, for purposes of convenience and economy, shorter period of exposure to temperatures of at least 50° C. and preferably 100–150° C., may be employed. Higher temperatures may be used and, if desired, e. g., up to 200° C.

The amount of water to be associated with the copolymer during conversion to the insoluble state may be substantially varied. Usually, it is found that at least 1% by weight, based on the amount of heteropolymer is required for effective results. However, a large excess of water, e. g., 100–1000% or more, based on the amount of heteropolymer, may be used without detracting from conversion to the water-insoluble state. In casting films, it is usually preferred that mutually compatible proportions of the water and heteropolymer be used.

In preparing the copolymers of the invention, the polymerizing temperature may be substantially varied and the particular temperature employed depends upon the characteristics desired in the polymeric material and the nature of the materials being polymerized. Usually, it is found that temperatures of 30–100° C. are satisfactory.

Instead of carrying out the polymerization in the presence of a material such as benzene which is a solvent for the monomeric materials, but a non-solvent for the heteropolymer, the well known mass polymerization type of process may be used. However, it is frequently desirable to carry out the polymerization in the presence of a solvent for the monomers which is a non-solvent for the polymer since the reaction is readily controlled and the product is easily recovered in the form of a fine powder. In place of benzene, other inert liquids may be used which meet the requirement set forth above, e. g., toluene, xylene, chlorobenzene, chlorotoluene, chloroxylene, dichloroethylene, trichloroethylene and the corresponding bromo or fluoro compounds.

Other methods of polymerization known to those skilled in the art may be used, e. g., polymerization in a solvent for both the monomeric materials and the copolymers. However, aside from traces thereof, water should be excluded from the polymerization charge.

Subject to the limitation that at least 25% of the copolymerizable material on a molar basis is vinyl formate, the nature and amount of the materials having a $CH_2=C<$ group which are copolymerized with the maleic anhydride may be substantially varied. Usually, it is preferred that the molar ratio of maleic anhydride to the copolymerizable material does not exceed 1:1 since the use of excess maleic anhydride may be undesirable in some cases. However, it may be desirable that the molar ratio of copolymerizable material to maleic anhydride exceed 1:1, although the amount of copolymerizable material should not be so high as to produce a water-insoluble heteropolymer. A preferred range of proportions is 1–2 mols of copolymerizable material for every mol of maleic anhydride.

It is usually desirable that the polymerization be carried out in the absence of air, e. g., in the presence of an inert gas. To accomplish this result, it is customary to sweep out the air above the polymerization charge with such an inert gas as nitrogen, hydrogen, carbon dioxide or the like. Alternatively, the air may be swept out with the vapors of one or more of the polymerizable materials, either by passing the vapors through the charge or by applying a partial vacuum to the reaction vessel to cause an ingredient therein to boil momentarily.

Usually, it is desirable to carry out the polymerization in the presence of a catalyst, although under some circumstances the polymerization may proceed with sufficient rapidity in the absence of a catalyst. When catalysts are used, they may comprise such oil-soluble per compounds as lauroyl peroxide, benzoyl peroxide, ditertiary butyl peroxide, oleyl peroxide, toluyl peroxide and the like, or mixtures of these and other catalysts. In certain cases, the action of light may be helpful in expediting polymerization.

The copolymers of the invention are found to possess a high degree of utility for many purposes. Among the uses for these products are their employment as coating compositions or in the formation of free films. In the case of these water-soluble heteropolymers, there is the added advantage of being able to use water as a solvent.

These products may also be used as granulating agents in polymerization processes, as water thickeners, in paints, in printing inks, in textile sizes, in coating compositions for paper, leather, wood, metals, etc., in adhesives, etc.

A particularly valuable use of the heteropolymers of the invention is for the purpose of dispersing monomeric materials during the polymerization thereof in aqueous media. The use of the products of this type as dispersing agents in the preparation of vinyl halide polymers in granular form, is illustrated below by the examples in Table II.

In each example in Table II, the procedure used is that given below:

200 parts of water are placed in a glass-lined autoclave and the heteropolymer of the indicated example is added in the amount shown and dissolved in the water by heating and stirring the mixture. Thereafter, 0.2 part of lauroyl peroxide is introduced and the air in the autoclave is swept out with vinyl chloride gas. The autoclave is then sealed and 100 parts of vinyl chloride are introduced. The resulting mixture is heated and stirred at 50° C. for 20 hours. As a result of this treatment, substantially all of the vinyl chloride is polymerized, i. e., more than 95%. The polymeric products comprise powders possessing varying degrees of coarseness as indicated in Table II. The polymer is recovered by centrifuging the aqueous product, washing the recovered polymers with water and finally drying the powdery products at moderately elevated temperatures.

Table II

| Example | Heteropolymer | | Polymer |
|---|---|---|---|
| | Type | Amount | |
| | | Parts | |
| VII | Example II | 0.2 | fine powder. |
| VIII | do | 0.4 | Do. |
| IX | Example IV | 0.2 | powder. |
| X | do | 0.4 | Do. |

In contrast to the prior products made by suspension polymerization in the presence of metallic salts as suspending agents, sheets and other articles free from haze and having exceptionally good electrical properties may be manufactured from the polymerization products of Examples VII–X without subjecting these products to the extensive and expensive washing operations necessary when such prior products are used. Furthermore, the products of Examples VII–X are characterized by exceptionally good heat and light stability.

A particular feature of the polymers made in the presence of the heteropolymers of the invention, is the fact that the suspending agent is converted into the water-insoluble state during the polymerization and/or drying of the resulting polymer.

As indicated hereinbefore, the heteropolymers of the invention are made from maleic anhydride and materials copolymerizable therewith having a $CH_2=C<$ group, at least 25% of the copolymerizable material, on a molar basis, being vinyl formate. Copolymerizable materials which may be used along with the vinyl formate include vinyl esters of carboxylic acids, for example, vinyl acetate, vinyl propionate, vinyl butyrate, vinyl benzoate; esters of unsaturated acids, for example, methyl acrylate, ethyl acrylate, butyl acrylate, allyl acrylate and the corresponding esters of methacrylate acid; vinyl aromatic compounds, for example, styrene, orthochlorostyrene, parachlorostyrene, 2,5-dichlorostyrene, 2,4-dichlorostyrene, para-ethyl styrene, divinyl benzene, vinyl naphthalene, alpha-methyl styrene; dienes, such as butadiene, chloroprene; amides, such as acrylic acid amide, acrylic acid anilide; nitriles, such as acrylic acid nitrile.

While the invention has been described particularly with reference to copolymers of maleic anhydride, water-soluble copolymers of the invention include not only those made with maleic anhydride but also those in which there is substituted for maleic anhydride, maleic acid or such other alpha,beta-unsaturated carboxylic acids as acrylic acid, methacrylic acid, and crotonic acid. Mixtures of two or more of the foregoing may also be used.

The amount of material containing a $CH_2=C<$ group included in the copolymers is governed by the effect of the material on the water-solubility of the copolymer. Thus, the copolymers contemplated by the invention are soluble in water to the extent of at least 10 parts by weight for every 100 parts by weight of water. The amount and nature of the copolymerized material is correlated so as to produce a copolymer with this solubility, provided also that at least 25%, on a molar basis, is vinyl formate.

It is obvious that many variations may be made in the products and processes of this invention without departing from the spirit and scope thereof as defined in the appended claims.

What is claimed is:

1. A process which consists in treating with water at temperatures up to 200° C., a water-soluble copolymer of one mol of an acidic compound from the group consisting of maleic acid, maleic anhydride, acrylic acid, methacrylic acid and crotonic acid, with from one to two mols of a copolymerizable material containing a $CH_2=C<$ group, at least 25 mol percent of said copolymerizable material being vinyl formate, until the copolymer becomes insoluble in water, said copolymer, prior to treatment with water, being soluble in water at least to the extent of forming 10% solutions therein.

2. A process as in claim 1 wherein the acidic compound is maleic anhydride.

3. A process as in claim 2 wherein the copolymerizable material consists of vinyl formate.

4. A process as in claim 2 wherein the copolymerizable material consists of vinyl formate and vinyl acetate.

MASSIMO BAER.

REFERENCES CITED

The following references are of record in the file of this patent:

UNITED STATES PATENTS

| Number | Name | Date |
|---|---|---|
| 2,188,272 | Voss et al. | Jan. 23, 1940 |
| 2,200,437 | Voss et al. | May 14, 1940 |
| 2,308,581 | Barnes | Jan. 19, 1943 |

FOREIGN PATENTS

| Number | Country | Date |
|---|---|---|
| 487,056 | Great Britain | June 14, 1938 |